United States Patent [19]

Prescott et al.

[11] Patent Number: 4,515,444
[45] Date of Patent: May 7, 1985

[54] OPTICAL SYSTEM

[75] Inventors: Rochelle Prescott, Arlington; Dennis C. Leiner, Andover, both of Mass.

[73] Assignee: Dyonics, Inc., Andover, Mass.

[21] Appl. No.: 509,946

[22] Filed: Jun. 30, 1983

[51] Int. Cl.³ .................................................. G02B 5/16
[52] U.S. Cl. .................................... 350/413; 350/96.31
[58] Field of Search .................. 350/413, 96.19, 96.31, 350/96.29, 96.30

[56] References Cited

U.S. PATENT DOCUMENTS 3,658,407 4/1972 Kitano et al. ........................ 350/413
4,101,196 7/1978 Imdi ................................. 350/96.31

Primary Examiner—John K. Corbin
Assistant Examiner—P. M. Dzierzynski

[57] ABSTRACT

An optical system comprising at least two gradient index lenses further includes spacer means of substantially homogenous substance affixed therebetween to provide increased light throughput by substantial maximization of the optical invariant of the system.

20 Claims, 7 Drawing Figures

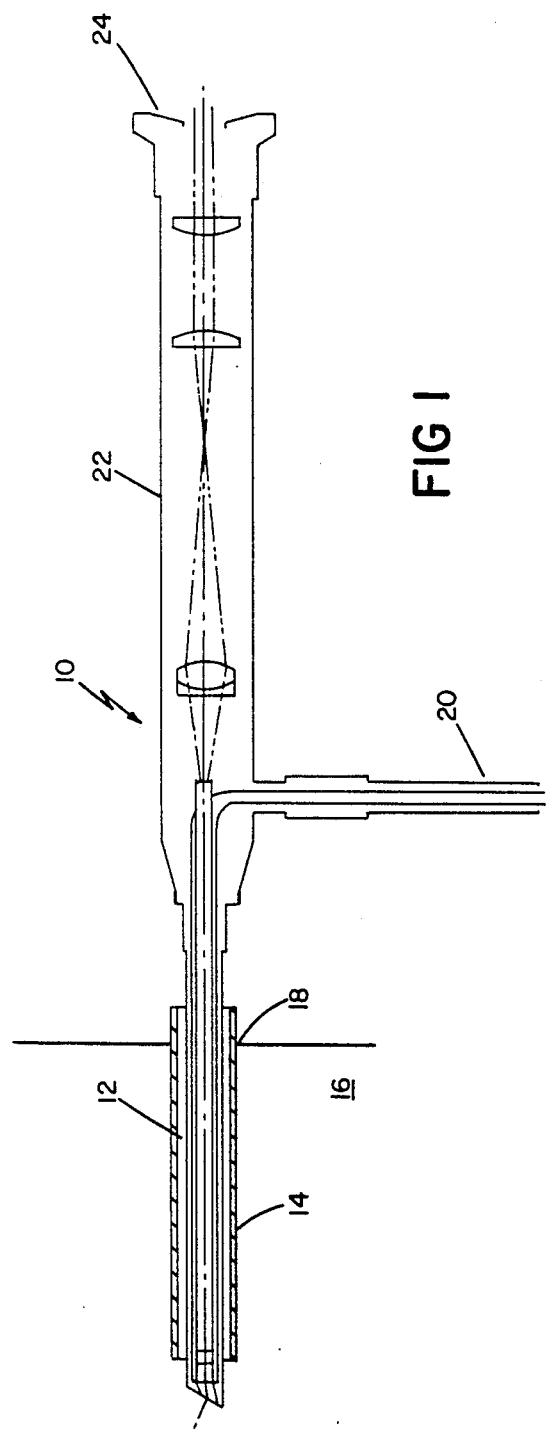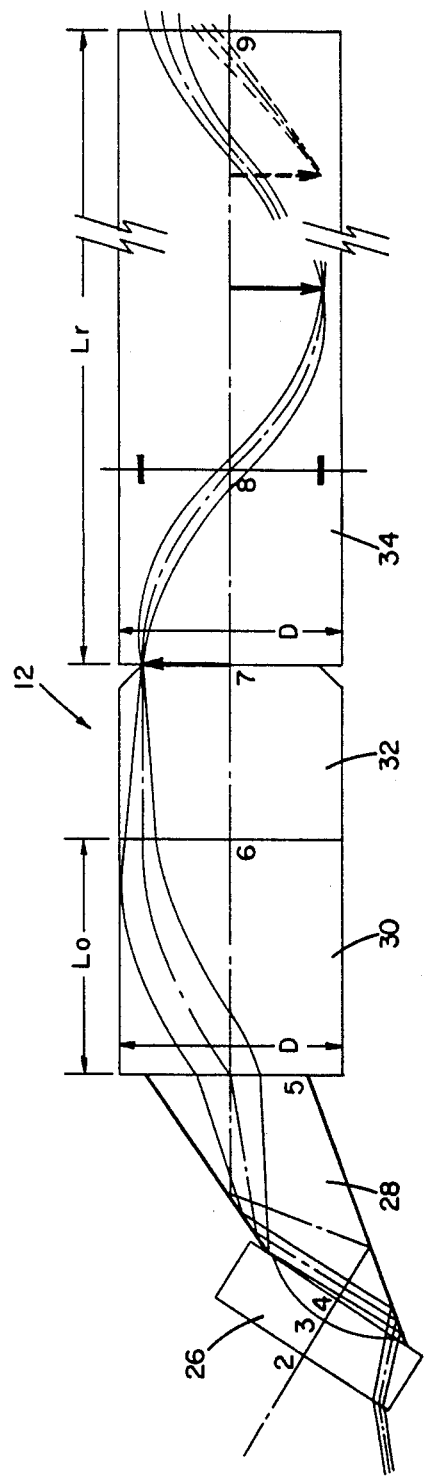

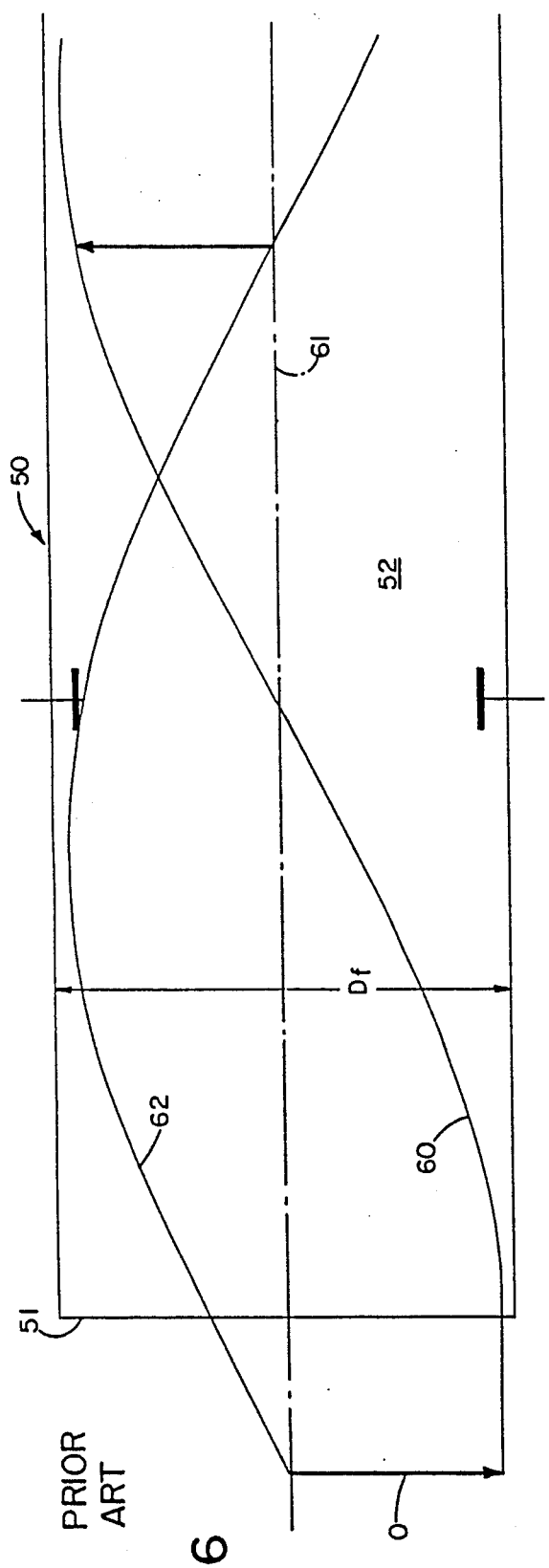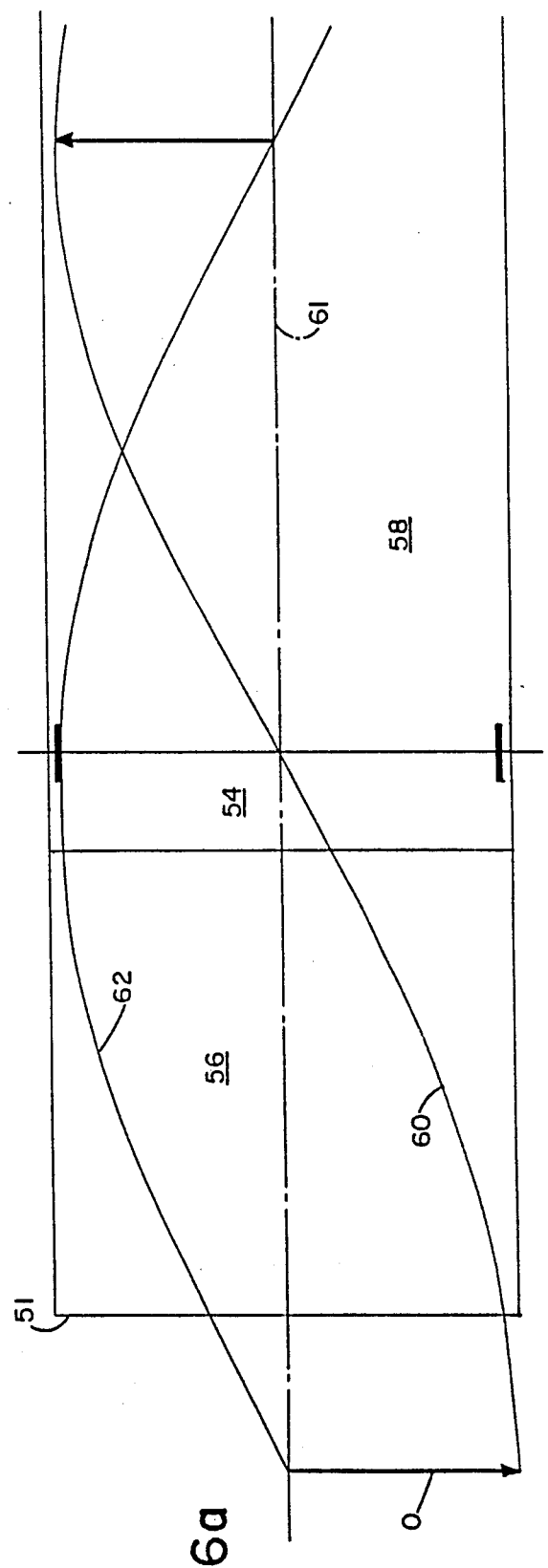
FIG 6 PRIOR ART
FIG 6a

OPTICAL SYSTEM

BACKGROUND

The invention relates to optical systems containing gradient index lenses.

Optical images may be transferred by means of a lens system employing, e.g., standard objective and relay lens sections or, in other applications, relay lenses alone. In applications where size is critical, e.g. in endoscopes for viewing within the body, e.g. in a joint, through a puncture wound without extensive surgical opening, a small-sized, e.g. 1 to 3 mm diameter, cylindrical rod lens system with radial index distribution (GRIN lens) may be substituted.

GRIN objective lenses currently available limit the field of view of the endoscope to less than is desired. Attempts to increase the field of view of the GRIN objective lens are limited by the glass chemistry of the lens material. Also, the field of view of the GRIN objective lens is decreased when it is necessary to use a line-of-sight prism attached to the endoscope. To increase the field of view, a homogeneous lens typically is affixed to the endoscope, however, the addition of this homogeneous lens changes the relative positions of the aperture stop and the field stop resulting in reduction of the optical invariant and thus the light throughput of the system.

The usual method of correcting for the decrease of the light throughput is to increase the diameter of the optical elements. However, in many applications, e.g., endoscopes, it is desirable that the diameter of the system be maintained at a minimum.

SUMMARY OF THE INVENTION

According to the invention, an optical system comprises at least two gradient index lenses of predetermined diameter, and means for increasing the light throughput transmitted through the lenses by substantial maximization of the optical invariant of the system, the image transmitted through the system being comprised of a chief ray and an axial ray, a first gradient index lens disposed uplight of the means having a length preselected whereby at the rear surface of the first lens a first of the rays has a slope of essentially zero and a second ray has a negative slope, the means is a substantially homogeneous spacer affixed to the rear surface of the first gradient index lens, the spacer being adapted to transmit rays received through the first lens essentially without refraction, and having a length preselected to cause the ray having a negative slope to intersect the center axis of the system approximately at the rear surface of the substantially homogeneous spacer, a second gradient index lens affixed to the rear surface of the substantially homogeneous spacer, the transmitted image received at the first surface of the second gradient index lens thereby having a height substantially approaching the radius of the lens system, whereby the optical invariant of the second gradient index lens is substantially maximized for increased light throughput.

In preferred embodiments, both gradient index lenses are axially symmetrical and are graded radially; the first ray is the chief ray, the second rays being the axial ray, preferably the first gradient index lens is an objective lens, and the second gradient index lens in a relay lens, more preferably a negative lens is affixed to the uplight end of the objective lens, the field of view through the system thereby being increased, or a positive lens is affixed to the uplight end of the objective lens, the field of view through the system thereby being decreased; the system further comprises a line-of-sight prism, whereby the direction of view through the system is inclined; the first ray is the axial ray, the second ray being the chief ray, preferably both gradient index lenses are relay lenses; the thickness of the first gradient index lens is chosen such that an image of the object is situated a substantial distance away from the downlight end of the first lens; the system is adapted for use in an endoscope; the predetermined diameter of each gradient index lens is of the order of about 1 to 3 mm.

According to another aspect of the invention, a method for increasing the light throughput transmitted through an optical system by substantial maximization of the optical invarient of the system is also provided.

In a preferred embodiment of this aspect of the invention, the length of the substantially homogeneous spacer is selected to substantially maximize the optical invariant of the system by the steps comprising:

(A) Selecting an objective lens with predetermined length and optical characteristics;

(B) Selecting an object distance at which to optimize the system;

(C) Determining the ray path having a negative slope at the chosen object distance by paraxial ray trace formulae through to the downlight end of the objective lens and determining the distance from the downlight end of the objective lens to the image position in air by the formula:

$$L = H/U$$

where:
- L = distance from the downlight end of the objective lens to the image in air,
- H = height of the axial ray at the downlight end of the objective lens, and
- U = angle of the axial ray with the optical axis after refraction into air from the downlight end of the objective lens; and (D) Determining the optical invariant maximizing spacer thickness for a given refractive index by the formula:

$$T = L/N$$

T = optical invariant maximizing spacer thickness, and

N = refractive index of the optical invariant maximizing spacer, preferably the method includes the further steps comprising:

(E) Determining optical aberrations for the optical system having a spacer of refractive index N and of length T determined according to the method; and (F) Repeating steps D and E if necessary for a different given refractive index to obtain desired values for the optical aberrations.

DESCRIPTION OF THE PREFERRED EMBODIMENT

The structure and operation of a preferred embodiment of the invention will now be described, after briefly describing the drawings.

DRAWINGS

FIG. 1 is a side view representation of an endoscope;

FIG. 2 is an enlarged side view representation of the optical system of a preferred embodiment;

FIG. 4 is a diagrammatic side view of an optical system for an endoscope with maximized optical invariant according to the invention, while FIGS. 6 and 6a are similar views of optical systems for endo-microscopes, respectively without and with benefit of the invention.

STRUCTURE

Figure 4:
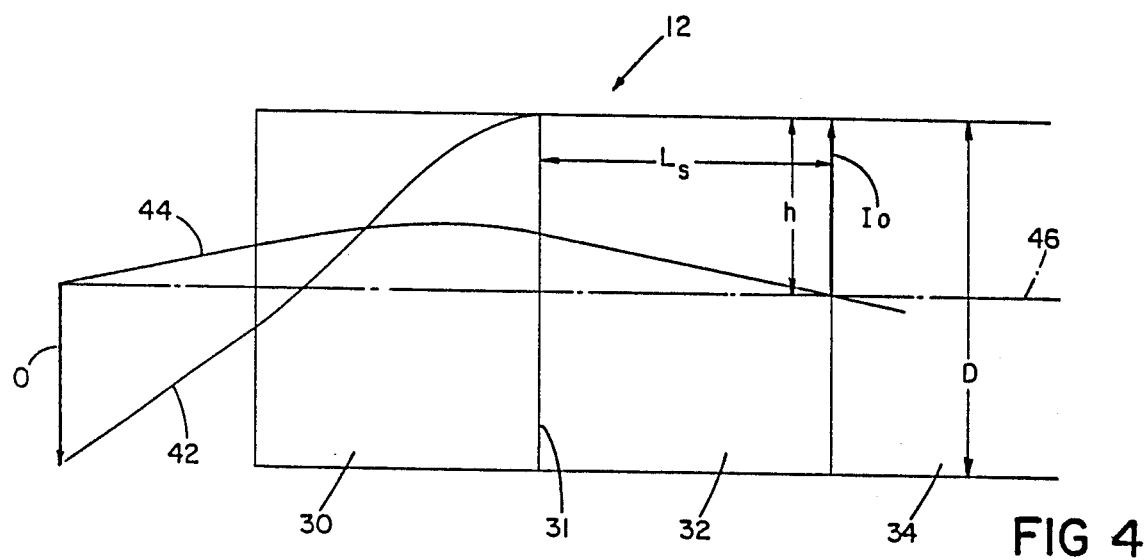

Referring to FIG. 1, a typical endoscope 10, e.g. a Needlescope ® manufactured by Dyonics, Inc. of Andover, Mass., is shown. Endoscopes are typically used by surgeons for viewing within cavities of the body, e.g. the joint of the knee, without requiring that the body be surgically opened. The probe lens 12 within a cannula 14 is inserted into body 16 through a small puncture wound 18. Fiberoptic device 20 directs light through light guide into the body to illuminate the viewing field and an image is returned through the probe lens to the probe ocular 22 which magnifies the image for viewing through eyepiece 24.

In FIG. 2, an enlarged view of the probe lens 12 is shown. At the distal end of probe 12 is field-widening lens 26 which increases the field of view without requiring a larger line-of-sight prism. At the proximal end of field-widening lens 26 is line-of-sight prism 28. The field of view provided is circular, with diameter depending upon the distance to the object and the angle of view. Through a standard endoscope, the angle is about 55°, in endoscopes with a field-widening lens, e.g. lens 26 as employed in the endoscope of FIG. 2, the angle may be increased to about 80°. At the proximal end of line-of-sight prism 28 is objective lens 30, typically a microlens supplied by Nippon Sheet Glass Co., of Japan. The microlens is a gradient-index lens with quadratic cylindrical index distribution, typically the change of index of the objective lens in this application is about 0.08, having length, $L_o$, and diameter, D. Typically in the application described, the length is 3.3 mm and the diameter is 1.3 mm. (Objective lenses of 1.0 mm are also typical, and lens diameters up to about 20 mm are commercially available. Larger diameter lenses, e.g. about 3.0 mm, have been sought but due to manufacturing and material limitations at the lengths required in this application, lenses at these larger diameters are not generally available.) Immediately proximal to objective lens is the optical invariant maximizing spacer 32, as discussed further below. Immediately proximal to the optical invariant maximizing spacer is a relay lens 34, also typically supplied by Nippon Sheet Glass.

The relay lens is also a gradient-index lens with quadratic cylindrical index distribution, typically having a change of index of about 0.003, and has the same diameter, D, as the objective lens, i.e., 1.3 mm in this application, and has a length, $L_r$, selected relative to the period of the lens. In this application, $L_r$ is typically of the order of 200 mm. Each system element is affixed to adjacent elements by means of transparent optical cement.

Figure 3:
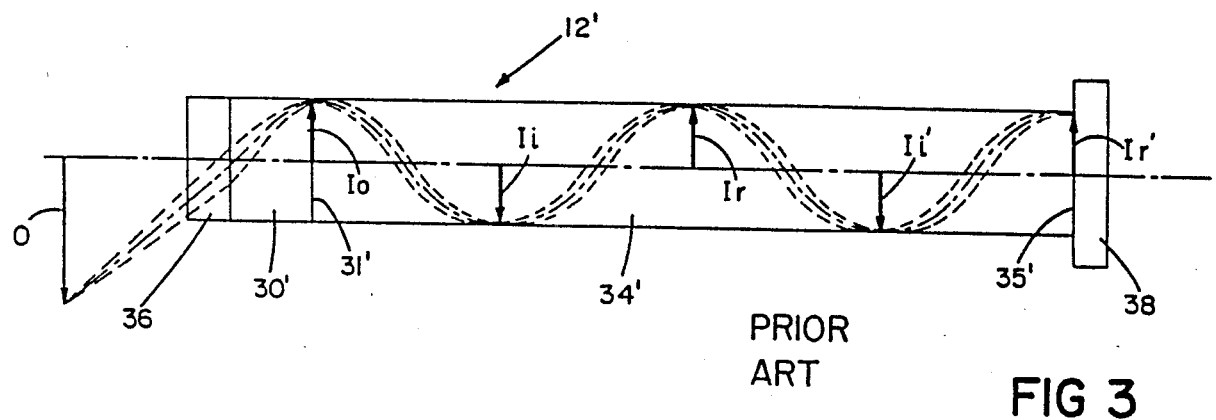
FIG. 3 is a diagrammatic side view of a standard gradient-index endoscope probe lens system.

Referring briefly to FIG. 3, the transmission of an image through a standard gradient index endoscope probe lens system without the substantially homogeneous spacer of the invention, is shown. The gradient index lens system 12' is directed through front cover glass 36 at object, 0, in the viewing area, typically, for an endoscope, spaced at a distance from the front surface of about 0 to 10 mm, preferably about 5 mm. An inverted image, $I_o$ of object, 0, is formed by the objective lens 30' at or near the rear surface 31' which interfaces with the relay lens 34'. The relay lens 34' shown is two periods in length, i.e., the transmitted image is reformed at four points within the lens: Ii, Ir, Ii', Ir' in order from object, 0, the last time at or near the rear or proximal face 35' of the lens, prior to rear cover glass 38.

The optical invariant of an optical system is defined as:

$$L_i = y_a u_b - y_b u_a$$

where:

$y_a$ = paraxial height of a given axial ray a,
$y_b$ = paraxial height of a given chief ray b,
$u_a$ = paraxial slope of a given axial ray a, and
$u_b$ = paraxial slope of a given chief ray b.

The optical invariant is a constant at all positions in a given lens system. Therefore the evaluation of the above equation for a given pair of rays a and b will always yield the same numerical value regardless of the position of evaluation of the lens. It is well known that the light throughput of the lens system is proportional to the square of the optical invariant.

It is convenient to evaluate the optical invariant at an image plane or aperture plane because at these planes $y_a = 0$ or $y_b = 0$, respectively, and the formula for the optical invariant is simplified.

In a standard gradient index endoscope, e.g., FIG. 3, the wall of the relay lens is the aperture stop of the system and the wall of the objective lens is the field stop of the system. Since the diameters of the relay lens and objective lens are substantially equal in a standard gradient index endoscope, the diameter of the probe lens is both the field stop diameter and aperture stop diameter.

In addition to these properties of the gradient index endoscope, it is relevent to state that when the ray height in the gradient lens is at maximum i.e., has a height equal to half the diameter of the lens, the slope of the ray must be zero if it is to remain in the lens for a length greater than one-half period.

The previous discussion and an examination of the formula for optical invariant indicates that the maximum optical invariant is achieved only when the slope of the chief ray is zero at the image position.

Process

Referring to FIG. 4, a homogenous spacer 32 of proper length is inserted according to invention between the objective lens 30 and relay lens 34. Since spacer 32 is homogeneous, i.e. has substantially constant refractive index throughout, typically chosen to lie between the refractive indices of the adjacent lenses to minimize problems of reflection, and the slope of chief ray 42 is zero, there is no refraction of the chief ray and its slope remains zero in spacer 32. However, since axial ray 44 is inclined toward the axis, at a finite distance, axial ray 44 will cross the axis 46, at which point an image, $I_o$, is situated.

Figure 5:
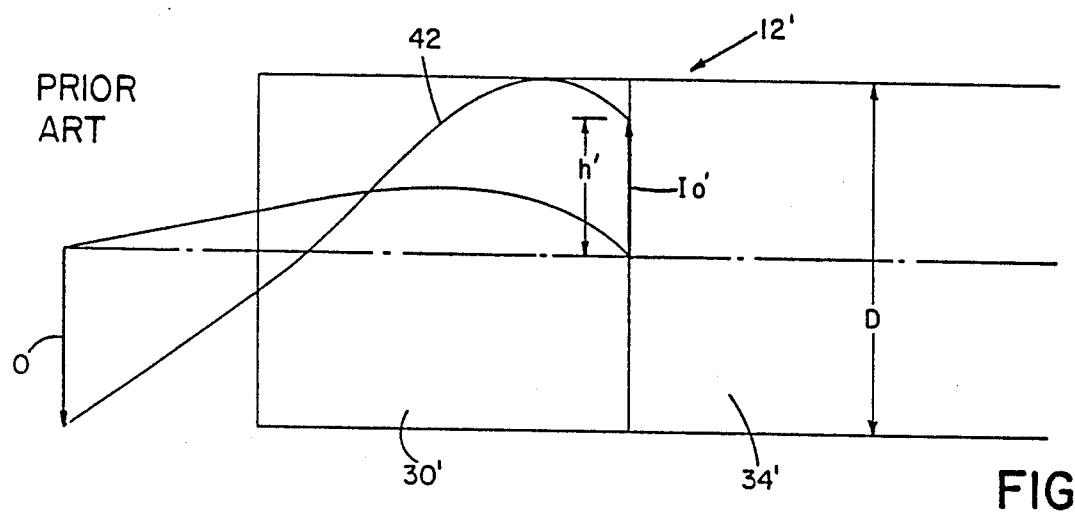
FIG. 5 is a similar view of a system without benefit of the invention.

In FIG. 5, a gradient index lens system 12' is shown where the image is located at a position where the slope of chief ray 42 is subtantially different than zero. It is evident that the height, h', of the image $I_o'$ is less than half the diameter, D, of the probe lens 12'.

Comparing the optical invariants evaluated at the images in FIGS. 4 and 5, the height, h, of image, $I_o$ in FIG. 4 is greater than the height, h', of image $I_o$ in FIG. 5, and the axial ray slopes are equal. Therefore, the optical invariant in the optical system of FIG. 4 has been increased by use of homogeneous spacer 32 over that possible in the standard system shown in FIG. 5, and the desired effect of increased light throughput has been simply achieved.

Referring back to FIG. 4, the optimum length, $L_s$, of spacer 32 is determined by calculating the path of axial ray 44 at the chosen object distance by paraxial ray trace formulae through to the downlight end 31 of the objective lens 30 and determining the distance from the downlight end of the objective lens to the image position in air by the formula:

$$L = H/U$$

where:

L = distance from the downlight end 31 of the objective lens 30 to the image in air, H = height of axial ray 44 at the downlight end 31 of the objective lens 30, and U = angle of the axial ray 44 with the optical axis 46 after refraction into air from the downlight end of the objective lens.

The spacer length is then calculated by the formula:

$$T = L/N$$

where:

T = optical invariant maximizing spacer length, and
N = refractive index of the spacer.

EXAMPLES

The following are examples of optical invariant maximized lens systems with components determined according to the invention. The results are summarized in Table I.

TABLE 1

| Surf | Curvature | Thickness | Glass |
|---|---|---|---|
| | | Example 1 | |
| 0 | 0.0000 | 4.0316 | Water |
| 1 | 0.0000 | −1.0316 | Water |
| 2 | 0.0000 | 0.3700 | Cubic Zirconia |
| 3 | 0.9000 | 0.0580 | Norland 61 Cement |
| 4 | 0.0000 | 1.8800 | Cubic Zirconia |
| 5 | 0.0000 | 3.3340 | Selfoc ® Microlens |
| 6 | 0.0000 | 1.4400 | Schott F3 |
| 7 | 0.0000 | 17.4498 | Selfoc ® Rod Lens |
| 8 | 0.0000 | 122.1483 | Selfoc ® Rod Lens |
| 9 | 0.0000 | 0.0004 | Air |
| | | Example 2 | |
| 0 | 0.0000 | 7.4952 | Water |
| 1 | 0.0000 | −0.7384 | Water |
| 2 | 0.0000 | 0.4000 | Schott BK7 |
| 3 | 2.2700 | 0.1200 | Air |
| 4 | 0.0000 | 1.8800 | Cubic Zirconia |
| 5 | 0.0000 | 2.500 | Selfoc ® Microlens |
| 6 | 0.0000 | 3.6700 | Schott F3 |
| 7 | 0.0000 | 17.4498 | Selfoc ® Rod Lens |
| 8 | 0.0000 | 122.1486 | Selfoc ® Rod Lens |
| 9 | 0.0000 | 0.0003 | Air |
| | | Example 3 | |
| 0 | 0.0000 | 6.3742 | Water |
| 1 | 0.000 | −0.6861 | Water |
| 2 | −0.7900 | 1.0000 | Cubic Zirconia |
| 3 | 0.0000 | 1.8800 | Cubic Zirconia |
| 4 | 0.0000 | 2.5000 | Selfoc ® Microlens |
| 5 | 0.0000 | 2.5800 | Schott F3 |
| 6 | 0.0000 | 17.4498 | Selfoc ® Rod lens |

TABLE 1-continued

| Surf | Curvature | Thickness | Glass |
|---|---|---|---|
| 7 | 0.0000 | 122.1486 | Selfoc ® Rod lens |
| 8 | 0.0000 | 0.0177 | Air |

Referring to FIG. 2, the surfaces are numbered by accepted design practice, i.e. surface (0) is the object plane; surface (1) is the entrance pupil (neither shown); surface (2) is the first physical surface, i.e. the front surface of the field-widening lens; surface (3) is the next surface, i.e. the interface of the field-widening lens and the epoxy cement; surface (4) is the interface of the epoxy cement and the direction-of-view prism; surface (5) is the interface of the prism and the objective lens; surface (6) is the interface of the objective lens and the optical invariant maximizing spacer; surface (7) is the interface of the spacer with the relay lens; surface (8) is the interface between relay lens sections at the aperture stop; and surface (9) is the rear surface of the relay lens. The axial lengths are measured from the indicated surface to the next consecutively numbered surface, positive distances being to the right. Curvature of a surface is indicated as the inverse of the radius of curvature and is positive if the center of curvature is to the right of the surface.

EXAMPLE 1

In this example, the field widening lens 26 and direction-of-view prism 28 are cubic zirconia, joined by Norland 61 epoxy cement. Objective lens 30 is a Selfoc ® Microlens supplied by Nippon Sheet Glass Co. of Japan. Spacer 32 is standard optical glass having a substantially constant refractive index, in this example Schott F3, supplied by Schott Optical Glass Co. of Duryea, Pennsylvania. Relay lens 34 is two segments of Selfoc ® Rod Lens, also from Nippon Sheet Glass, joined at the aperture stop (surface (8)).

EXAMPLE 2

In this example, the epoxy cement layer was eliminated and was replaced by an air layer. Also, the field-widening lens of cubic zirconia used in Example 1 has been replaced with a lens of lower refractive index of Schott 13K7 supplied by Schott Optical Glass Co.

EXAMPLE 3

In this example, the same materials as in Example 1 were employed, but the curved surface of the field-widening lens was oriented outward, and the space between the field-widening lens and the prism was eliminated.

OTHER EMBODIMENTS

Other embodiments of the invention are within the following claims. For example after evaluation of the optical aberrations, the refractive index N can be changed and a new spacer length T can be calculated in order to provide a system having optical aberrations within desired limits. For maximization of the optical invariant, a spacer having constant refractive index is preferred. However, the benefits of the invention may still be enjoyed, although to a lesser degree, with spacers having somewhat less constant refractive indices.

Also, in applications where it is desired to restrict the field of view of the endoscope in order to view small areas with high resolution, e.g. in a gradient index endomicroscope, a GRIN objective lens may not used. Referring to FIG. 6, the field diameter, $D_f$, of endo-microscope 50 is equal to the diameter of the GRIN relay lens 52. If the object, 0, to be viewed is not located at the front surface 51 of the GRIN relay, the optical invariant and thus the endoscope brightness will not be maximized. The typical object distance provided is about 0 to 5 mm, and the diameter of the field of view is constant, being equal to the diameter of the lens, and independent of the object distance. Referring now to FIG. 6a, a homogeneous spacer 54 is inserted between sections 56, 58 of a relay lens to cause the chief ray 60 to intersect the optical axis 61 at the same plane as that at which the axial ray 62 is parallel with the axis. Thus the optical invariant of the endo-microscope is maximized. The same calculations described above with the chief ray and axial ray parameters reversed may be performed to determine spacer length.

We claim:

1. An optical system comprising
   at least two gradient index lenses of predetermined diameter,
   and spacer means between said lenses for increasing the light throughput transmitted through said lenses by substantial maximization of the optical invariant of said system,
      the image transmitted through said system being represented by a chief ray and an axial ray,
      a first said gradient index lens disposed uplight of said spacer means having a length preselected whereby at the downlight surface of said first lens a first of said rays has a slope of essentially zero and a second of said rays has a negative slope,
   said spacer means being of substantially homogeneous substance and affixed to the downlight surface of said first gradient index lens, said spacer means being adapted to transmit said rays received through said first lens essentially without refraction, and said spacer means having a length preselected to cause said ray that has a negative slope to intersect the center axis of said optical system approximately at the downlight surface of said substantially homogeneous spacer means,
      a second said gradient index lens affixed to the downlight surface of said substantially homogeneous spacer means, the transmitted image received at the first surface of said second gradient index lens thereby having a height substantially approaching the radius of said optical system,
      whereby the optical invariant of said second gradient index lens is substantially maximized for increased light throughput.

2. The optical system of claim 1 wherein both said gradient index lenses are axially symmetrical and are graded radially.

3. The optical system of claim 1 wherein
   the first of said rays is the chief ray, the second of said rays being the axial ray.

4. The optical system of claim 3 wherein the first said gradient index lens is an objective lens, and
   the second said gradient index lens is a relay lens.

5. The optical system of claim 4 wherein a negative lens is affixed to the uplight end of the objective lens, the field of view through said system thereby being increased.

6. The optical system of claim 4 wherein a positive lens is affixed to the uplight end of the objective lens, the field of view through said system thereby being decreased.

7. The optical system of claim 4, 5, or 6 wherein said system further comprises a line-of-sight prism, whereby the direction of view through said system is inclined.

8. The optical system of claim 1 wherein
   the first of said rays is the axial ray,
   the second of said rays being the chief ray.

9. The optical system of claim 8 wherein both said gradient index lenses are relay lenses.

10. The optical system of claim 4 or 8 wherein the thickness of the first said gradient index lens is chosen such that an image of the object is situated a substantial distance away from the downlight end of said first lens.

11. The optical system of claim 1 wherein said system is adapted for use in an endoscope.

12. The optical system of claim 1 wherein said predetermined diameter of each said gradient index lens is of the order of about 1 to 3 mm.

13. A method for increasing the light throughput transmitted through an optical system comprising at least two gradient index lenses of predetermined diameter by substantial maximization of the optical invarient of said system, the image transmitted through said system being represented by a chief ray and an axial ray, said method comprising,
   providing, in said optical system,
      a first said gradient index lens,
         selecting the length of said first lens to cause, at the downlight surface of said lens, a first of said rays to have a slope of essentially zero and a second of said rays to have a negative slope,
      a spacer means of substantially homogeneous substance,
         selecting the length of said spacer means to cause, approximately at the downlight surface of said spacer means, the ray having the negative slope to intersect the center axis of said optical system, and
      a second said gradient index lens,
   affixing said spacer means to the downlight surface of said first gradient index lens,
   affixing said second lens to the downlight surface of said spacer means,
   receiving the rays transmitted through the downlight surface said first lens into said spacer means, and transmitting therethrough the rays received essentially without refraction, and
   receiving the rays transmitted through the downlight surface of said spacer means into said second lens, the transmitted image received at the uplight surface of said second gradient index lens thereby having a height substantially approaching the radius of said optical system,
   whereby the optical invariant of said second gradient index lens is substantially maximized for increased light throughput.

14. The method of claim 13 wherein both said gradient index lenses are axially symmetrical and are graded radially.

15. The method of claim 13 wherein
   the first of said rays is the chief ray, the second of said rays being the axial ray.

16. The method of claim 15 wherein the first said gradient index lens is an objective lens, and
   the second said gradient index lens in a relay lens.

17. The method of claim 13 wherein
   the first of said rays is the axial ray, the second of said rays being the chief ray.

18. The optical system of claim 13 wherein both said gradient index lenses are relay lenses.

19. The method of claim 13, wherein the length of said spacer means is selected to substantially maximize the optical invariant of said optical system by the further steps comprising:
(A) Providing an objective lens of predetermined length and optical characteristics;
(B) Selecting the object distance at which to optimize the system;
(C) Determining the path of the said ray having a negative slope at the chosen object distance by paraxial ray trace formulae through to the downlight end of the objective lens and determining the distance from the downlight end of the objective lens to the image position in air by the formula:

$$L = H/U$$

where:
L = distance from the downlight end of the objective lens to the image in air,
H = height of the axial ray at the downlight end of the objective lens, and
U = angle of the axial ray with the optical axis after refraction into air from the downlight end of the objective lens; and
(D) Determining the optical invariant maximizing spacer means thickness for a given refractive index by the formula:

$$T = L/N$$

T = optical invariant maximizing spacer means thickness, and
N = refractive index of the optical invariant maximizing spacer means; and
(E) Providing said optical invariant maximizing spacer of the predetermined thickness T for use in combination with said objective lens in said system.

20. The method of claim 19 wherein said method includes the further steps comprising:
(F) Determining optical aberrations for said optical system having said spacer means of refractive index N and of length T determined according to the method; and
(G) Repeating steps D, E and F if necessary for a different given refractive index to obtain desired values for the optical aberrations.

* * * * *